(12) United States Patent
Sharma et al.

(10) Patent No.: US 11,678,404 B2
(45) Date of Patent: Jun. 13, 2023

(54) USER EQUIPMENT OVERHEATING HANDLING DURING LTE-NEW RADIO SIMULTANEOUS UL TRANSMISSION

(71) Applicants: Sony Corporation, Tokyo (JP); Sony Mobile Communications Inc., Tokyo (JP)

(72) Inventors: Vivek Sharma, Basingstoke (GB); Yuxin Wei, Basingstoke (GB); Anders Berggren, Basingstoke (GB); Hideji Wakabayashi, Basingstoke (GB); Shinichiro Tsuda, Basingstoke (GB)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 0 days.

(21) Appl. No.: 16/651,354

(22) PCT Filed: Oct. 4, 2018

(86) PCT No.: PCT/EP2018/077026
§ 371 (c)(1),
(2) Date: Mar. 27, 2020

(87) PCT Pub. No.: WO2019/068818
PCT Pub. Date: Apr. 11, 2019

(65) Prior Publication Data
US 2020/0275526 A1    Aug. 27, 2020

(30) Foreign Application Priority Data
Oct. 5, 2017  (EP) .................................. 17195072

(51) Int. Cl.
*H04W 88/06*       (2009.01)
*H04W 88/10*       (2009.01)
(Continued)

(52) U.S. Cl.
CPC .......... *H04W 88/06* (2013.01); *H04B 17/318* (2015.01); *H04L 5/0051* (2013.01);
(Continued)

(58) Field of Classification Search
CPC ........ H04W 88/06; H04W 88/10; H04W 8/24
See application file for complete search history.

(56) References Cited

U.S. PATENT DOCUMENTS

| 8,934,840 B1 * | 1/2015 | Yeung ..................... G06F 1/329 455/343.1 |
| 2009/0215442 A1 * | 8/2009 | Lindoff .................... H04B 1/40 455/423 |

(Continued)

FOREIGN PATENT DOCUMENTS

CN        109587757 B  *  4/2019  ............ H04W 48/08

OTHER PUBLICATIONS

International Search Report and Written Opinion dated Nov. 12, 2018 for PCT/EP2018/0//026 filed on Oct. 4, 2018, 14 pages.
(Continued)

*Primary Examiner* — Muthuswamy G Manoharan
(74) *Attorney, Agent, or Firm* — Xsensus LLP

(57) ABSTRACT

The present disclosure pertains to a user equipment for a mobile telecommunications system, which has a circuitry configured to communicate with a new radio base station and a LTE base station. The circuitry is further configured to: perform simultaneous uplink communication with the LTE base station and the new radio base station; detect an overheating situation; and transmit capability information in response to detecting the overheating situation.

12 Claims, 3 Drawing Sheets

(51) Int. Cl.
*H04W 8/24* (2009.01)
*H04W 24/10* (2009.01)
*H04B 17/318* (2015.01)
*H04L 5/00* (2006.01)

(52) U.S. Cl.
CPC ............. *H04W 8/24* (2013.01); *H04W 24/10* (2013.01); *H04W 88/10* (2013.01)

(56) References Cited

U.S. PATENT DOCUMENTS

| | | | |
|---|---|---|---|
| 2010/0323743 A1* | 12/2010 | Huan | H04W 52/367 455/522 |
| 2012/0075992 A1* | 3/2012 | Shahidi | H04W 52/0251 370/235 |
| 2016/0157228 A1 | 6/2016 | Yum et al. | |
| 2018/0035438 A1* | 2/2018 | Pao | H04W 72/0413 |
| 2018/0199185 A1* | 7/2018 | Tenny | H04W 8/22 |
| 2020/0022095 A1* | 1/2020 | Kim | H04W 52/365 |
| 2020/0214065 A1* | 7/2020 | Tomala | H04W 8/24 |

OTHER PUBLICATIONS

3GPP, "LTE;Evolved Universal Terrestrial Radio Access (E-UTRA); Radio Resource Control (RRC)", Protocol Specification, Technical Specification 36.331 version 13.0.0, Release 13, Jan. 2016, pp. 1-669.

Huawei, "Report of email discussion [98#43][LTE/TEI14] UE overheating problem", 3GPP TSG-RAN WG2 #99, R2-1708219, Berlin, Germany, Aug. 21-25, 2017, pp. 1-16.

Nokia and Nokia Shanghai Bell, "Recap of intended UE assistance to diminish thermal issues", 3GPP TSG-RAN WG2 #99, R2-1709212, Berlin, Germany, Aug. 21-25, 2017, 5 pages.

Sony, "LTE-NR Coexistence", 3GPP TSG RAN WG2 Meeting #99bis, R2-1711018, Prague, Czech Republic, Oct. 9-13, 2017, 6 pages.

3GPP, "Signalling for Single/Dual UL Tx (current status)," RAN2 Chairman (Intel), RP-172082—RAN2 Status Report to RAN#77, 2017, pp. 1-2.

* cited by examiner

USER EQUIPMENT OVERHEATING HANDLING DURING LTE-NEW RADIO SIMULTANEOUS UL TRANSMISSION

CROSS-REFERENCE TO RELATED APPLICATIONS

The present application is based on PCT filing PCT/EP2018/077026, filed Oct. 4, 2018, which claims priority to EP 17195072.8, filed Oct. 5, 2017, the entire contents of each are incorporated herein by reference.

TECHNICAL FIELD

The present disclosure generally pertains to base stations and user equipments for a mobile telecommunications system.

TECHNICAL BACKGROUND

Several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

A candidate for providing the requirements of 5G is the so-called Long Term Evolution ("LTE"), which is a wireless communications technology allowing high-speed data communications for mobile phones and data terminals and which is already used for 4G mobile telecommunications systems. Other candidates for meeting the 5G requirements are termed New Radio (NR) Access Technology Systems (NR). An NR can be based on LTE technology, just as LTE was based on previous generations of mobile communications technology.

LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation ("3G") network technologies.

LTE is standardized under the control of 3GPP ("3rd Generation Partnership Project") and there exists a successor LTE-A (LTE Advanced) allowing higher data rates than the basic LTE and which is also standardized under the control of 3GPP.

For the future, 3GPP plans to further develop LTE-A such that it will be able to fulfill the technical requirements of 5G.

As the 5G system will be based on LTE or LTE-A, respectively, it is assumed that specific requirements of the 5G technologies will, basically, be dealt with by features and methods which are already defined in the LTE and LTE-A standard documentation.

As discussed, in 3GPP a work Item (WI) on New Radio Access Technology (NR) has been agreed. The new Radio Access Technology (RAT) is expected to operate in a large range of frequencies, from hundreds of MHz to 100 GHz and it is expected to cover a broad range of use cases. Use cases, which are considered, are, for example:
Enhanced Mobile Broadband (eMBB)
Massive Machine Type Communications (mMTC)
Ultra Reliable & Low Latency Communications (URLLC)

At least for initial deployment, NR and LTE are expected to coexist.

Although there exist signaling techniques for LTE, it is generally desirable to improve coexisting situations between NR and LTE.

SUMMARY

According to a first aspect, the disclosure provides a user equipment for a mobile telecommunications system including circuitry configured to communicate with a new radio base station and a LTE base station, wherein the circuitry is further configured to perform simultaneous uplink communication with the LTE base station and the new radio base station; detect an overheating situation; and transmit capability information in response to detecting the overheating situation.

According to a second aspect, the disclosure provides a base station for a mobile telecommunications system including circuitry configured to communicate with at least one user equipment, wherein the circuitry is further configured to: receive capability information from the eat least one user equipment, wherein the capability information is transmitted by the user equipment based on a detected overheating situation.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
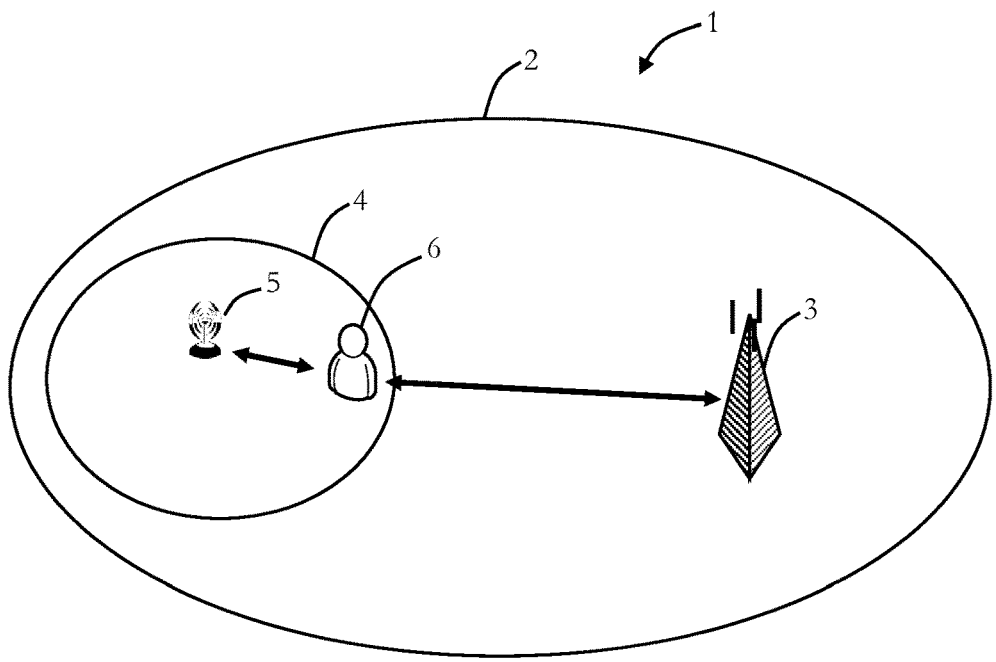
FIG. 1 illustrates a radio access network including LTE and NR base stations.

Before a detailed description of the embodiments under reference of FIG. 1 is given, general explanations are made.

As mentioned in the outset, several generations of mobile telecommunications systems are known, e.g. the third generation ("3G"), the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

As discussed, a candidate for providing the requirements of 5G is the so-called Long Term Evolution ("LTE"), which is a wireless communications technology allowing high-speed data communications for mobile phones and data terminals and which is already used for 4G mobile telecommunications systems. Other candidates for meeting the 5G requirements are termed New Radio (NR) Access Technology Systems (NR). An NR can be based on LTE technology, just as LTE was based on previous generations of mobile communications technology.

As mentioned, LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation ("3G") network technologies, and there exists the successor LTE-A (LTE Advanced) allowing higher data rates than the basic LTE and which is also standardized under the control of 3GPP.

As the 5G system will be based on LTE or LTE-A, respectively, it is assumed that specific requirements of the 5G technologies and, thus, of embodiments described herein, will, basically, be dealt with by features and methods which are already defined in the LTE and LTE-A standard documentation.

As discussed, in 3GPP a work Item (WI) on New Radio Access Technology (NR) has been agreed and the new Radio Access Technology (RAT) is expected to operate in a large range of frequencies, from hundreds of MHz to 100 GHz and it is expected to cover a broad range of use cases, examples of which are given in the outset.

At least for initial deployment, NR and LTE are expected to coexist, as is also illustrated in FIG. 1. FIG. 1 illustrates an embodiment of a Radio Access Network RAN 1, which has a macro cell 2, which is established by a LTE (base station) eNodeB 3. Moreover, in the macro cell 2, a NR cell 4 is located, which is established by a NR (base station) eNodeB 5 (the NR eNodeB may also be referred to as NR gNB or NR gNodeB).

A (user equipment) UE 6 can communicate with the LTE eNodeB 3 and, as long it is within the NR cell 4, it can also communicate with the NR eNodeB 5.

Figure 2:
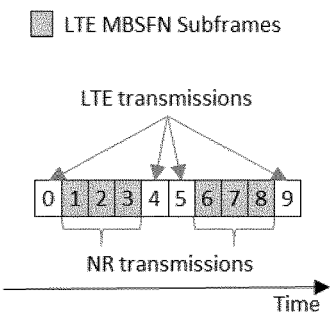
FIG. 2 illustrates the coexistence of NR and LTE subframe transmission.

The coexistence of the NR and LTE may be implemented in some embodiments, by using the same frequency resources for NR and LTE, but NR and LTE are differentiated using TDM (Time Division Multiplexing), e.g. NR uses LTE MBSFN (Multicast-Broadcast Single Frequency) subframes, as illustrated in FIG. 2.

FIG. 2 illustrates an example, where there are up to a maximum of six LTE MBSFN subframes in a radio frame. Here, exemplary, six LTE MBSFN subframes, i.e. subframes 1, 2, 3, 6, 7, 8, are used for NR transmissions and the remaining subframes are used for LTE transmissions.

Figure 3:
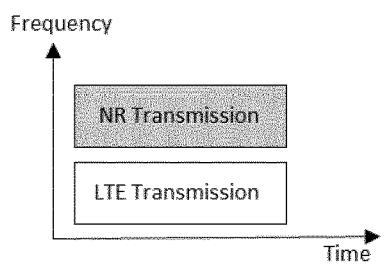
FIG. 3 illustrates the coexistence of NR and LTE transmission in the frequency domain.

Another implementation, which may be used in some embodiments as illustrated in FIG. 3, is to use separate frequency resources and implement NR as a secondary carrier in a multi-carrier operation, i.e. LTE uses one frequency carrier (lower box in FIG. 3) and NR uses another frequency carrier (upper box in FIG. 3).

One of the common deployment will be, in some embodiments, where LTE will use FDD (Frequency Division Duplexing) mode of operation and NR deploys TDD (Time Division Duplexing) mode of operation.

Such coexistence in certain frequency bands may result in two simultaneous peaks, in some embodiments, generated by the UE on uplink if simultaneous uplink in LTE and NR is configured and used.

Such peaks may generate intermodulation products, which will interfere the receiver in the UE and, in a case where, where for example, LTE deploys FDD and NR deploys TDD, the LTE downlink (DL) performance might be impacted.

Generally, the problem may be severe, in some embodiments, if LTE is impacted because intermediate frequencies are already standardized and any interference will be detrimental to the LTE performance.

However, as NR is a new system under design, it offers design flexibility and design of intermediate frequencies may take any interference from existing LTE bands into account in some embodiments. Hence, some embodiments address a scenario, where LTE deploys FDD and NR deploys TDD in the coexistence situation.

In some embodiments, for very specific frequency allocations within LTE–NR band combinations, reference sensitivity power level degradation may be experienced due to intermodulation distortion issues when a dual UL transmission is used by the user equipment.

According to 3GPP document RP-172085 ("Signalling for Single/Dual UL Tx (current status)", RAN 2 status Report to Ran #77), a UE capability indicates that the UE is not allowed to have two simultaneous UL transmissions (i.e. dual NR and LTE transmission in the UL) for the RAN4 specified channel allocations in a given band combination. In such a case, only one uplink transmission will be activated accordingly. RAN1 #89 (May) agreed that 5G NR needs to support non-standalone (NSA) NR UEs, which may not be capable of transmitting on two uplinks at the same time when they are in a LTE–NR Dual Connectivity (DC) configuration.

Thus, it has been recognized that there is a need to support for single Tx (transmission) UEs for LTE–NR DC.

At RAN2 #98 in Hangzhou, the UE overheating problem was discussed for LTE and the following agreements were made (see also 3GPP document R2-1708219, TSG-RAN WG2 #99, 21 to 25 Aug. 2017, Berlin, "Report of email discussion [98 #43] [LTE/TEI14] UE overheating problem):

1: To alleviate the UE's overheating problem, a specification based solution for eNB to reconfigure e.g. reduced number of activated component carriers, reduced MIMO layer capability, reduced modulation order of the UE is supported.

2: It is not considered to specify Option 1 (temperature report) as a solution to address UE overheating problem.

3. The solution will be based on option 3. (Report UE temporary category/capability) or option 4 (Assistance information for parameter re-configuration) or some combination. This does not exclude an indication to the eNB that the cause is due to overheating.

It has been recognized that for NR higher data rates, multi-beam operation etc. are to be specified, in some embodiments, which might lead to even more overheating problems.

It has been further recognized that the UE has the best understanding of its overheat situation, and since different UE's/manufacturer/brands have different hardware constructions and different heat sensitivities, and my perform temperature measurements potentially in different ways, it seems preferably, at least in some embodiments, to let the UE control the heat regulation.

Generally, different UEs may have different hardware configurations and, thus, may have different locations of temperature sensors in some embodiments.

Hence, unless a specific definition of the temperature measurement in a UE would be standardized, it has been recognized that a UE indication of a temperature would be an undefined value to report. Therefore, specifying such temperature measurement in a UE would likely be challenging.

For LTE it has been agreed that option 3, mentioned above, ("Report UE temporary category/capability") or option 4 ("Assistance information for parameter re-configuration") or some combination thereof will be used, and, generally, this might be a way to temporarily indicate a change in capability, in some embodiments.

It has also been agreed for NR (New Radio) to include temporary capability change indication or reporting.

Furthermore in a RAN2 #99 meeting it has been agreed (see also 3GPP TSG-RAN WG2 Meeting #99, Berlin, Germany, 21-25 Aug. 2017, RAN2 Chairman (Intel), Chairman notes, in particular sections 8.2.5 and 10.2.6):

For LTE:
1: Explicit indication of UE's overheating status is not supported. This indication is implicitly carried by UE's overheating report signalling.
2: Some reference to the overheating issue will be including in the CRs adding this feature.
3: UEAssistanceInformation is used to carry the request from the UE
4: UE's request is triggered by internal overheating caused by for example, the advanced CA, the higher order MIMO, the higher order modulation scheme being concurrently configured. This trigger will be described in the spec (FFS whether it is in stage 2 or stage 3 and detailed wording).
5: The prohibit timer in RRC is used to avoid UE's frequent requests.
6: RRCConnectionReconfiguration is used to indicate that the network can support the feature. If the network does not indicate support of the feature, the UE shall not send any request.
7: A 'reject' message from the network (in response to the request) is not supported.

And it is agreed that the UE provides a reduced UE category in the request.

For New Radio the following agreements are made:
In NR, the number of supported MIMO layers is signalled as explicit UE capability and not part of a UE category.
In NR, the modulation schemes are signaled as explicit UE capability and not part of a UE category.
RAN2 assumes that the UE's band combinations together with the baseband capabilities (modulation scheme, MIMO layers, . . . ) comprise all information necessary to calculate the maximum data rate achievable on each serving cell, in each cell group and per UE.
If RAN1 and RAN4 agree with that assumption, RAN2 intends to apply the following:
"A non-DC UE supporting a peak data rate that is lower than the data rate achievable according to the above-mentioned parameters indicates this by a per-UE category (data rate).
However, a UE supporting dual connectivity (MR–DC, NR–NR DC) shall not advertise a category (data rate) that is lower than the highest data rate achievable according to any of the DC band combinations (to avoid the need for inter-node negotiation of the data rate split)."

Based on the foregoing, there is a debate ongoing whether the UE should indicate not only its maximum UE capability for each RAT (Radio Access Technology), but also if there are some maximum limitations when for EN-DC (LTE–NR Dual-Connectivity) the capabilities are aggregated.

Thus, it has been recognized that there is need for a UE to indicate more dynamically that it has problems with certain configurations, e.g. for certain band combinations when configured for simultaneous (dual) uplink transmission (LTE+NR).

As discussed, in some scenarios an overheat situation may occur, when the UE is configured with Dual Uplink transmission LTE+NR, as mentioned above, and as also illustrated in FIG. 3.

Hence, it has been recognized that, in some embodiments, for solving the UE overheat issue with capability degradation, some indication could be used to indicate that it is the Dual UL Tx usage that is the cause for overheating in general.

Consequently, some embodiments pertain to a user equipment for a mobile telecommunications system including circuitry configured to communicate with a new radio base station and a LTE base station, wherein the circuitry is further configured to perform simultaneous uplink communication with the LTE base station and the new radio base station; detect an overheating situation; and transmit capability information in response to detecting the overheating situation.

Generally, the LTE base station may be based on the principles of LTE (LTE-A) and the new radio (NR) base station may be based on NR RAT, as also discussed above. The LTE base station may be based on the known eNodeB of LTE, as one example, and the NR base station may be based on the discussed NR eNodeB. The user equipment may be, for example, a mobile phone, smartphone, a computer, tablet, tablet personal computer, or the like, including a mobile communication interface, or any other device which is able to perform a mobile telecommunication via, for example, LTE and NR, such as a hot spot device with a mobile communication interface, etc. Hence, in some embodiments, the user equipment is configured to perform communication with the NR base station and the LTE base station simultaneously, such that the above-discussed coexistence issue may occur in some embodiments.

The overheating situation may be detected based on a predefined combination of a new radio uplink band and a LTE uplink band. As discussed above, some of the combinations of the new radio uplink band and the LTE uplink band may be problematic, since a double peak situation may occur which may result in overheating of the receiver. Such band combinations may be known in advance, and, thus, predefined, such that the overheating situation can be determined, if such a problematic band combination is used.

The overheating situation may also be detected based on a decoding error. For instance, an LTE PDCCH (Physical Downlink Control Channel) may not be decoded and, thus, a decoding error may occur. Based on the decoding error, it may be derived that an overheating situation causes the decoding error, such that thereby the overheating situation can be detected.

The overheating situation may be detected based on a signal strength of a reference signal. For instance, UE calculates the pathloss between the base station and the UE based on RSRP (Reference Signal Receiver Power) of the reference signal with base station Tx power. UE estimates the overheat problem or detects that an overheating situation may cause the pathloss, if the calculated pathloss may be lower than a predefined threshold value.

The overheating situation may be detected based on a temperature measurement of a receiver of the circuitry. As mentioned, the double peak situation may cause an overheating of the receiver of the user equipment which may be detected, based on a temperature measurement.

Furthermore, the overheating situation may be detected based on the simultaneous uplink communication with the LTE base station and the new radio base station, since the simultaneous uplink communication may cause overheating.

Furthermore, it may be detected in advance that an overheating situation may occur when an dual uplink transmission is initiated. Hence, in some embodiments, the overheating situation may be correlated with the ongoing simultaneous uplink communication with the LTE base station and the new radio base station, which also may cause overheating of the transmitter (in some embodiments receiver and transmitter are implemented as a transceiver unit such that also heating of the transmitter may cause problems of the receiver and/or a transmitter and receiver circuitry may be close to each other).

The overheating situation may be detected based on history information indicating a previous overheating situation. For instance, for a predefined uplink NR/LTE band combination it is known from the past that overheating occurred. Such history information can be used for detecting that an overheating situation may be present.

In some embodiments, the capability information is transmitted based on an assistance information signaling procedure, which is also known from LTE.

The capability information may indicate the overheating situation. For instance, an information element or a bit may be provided, for example, in an assistance information message, indicating that an overheating situation is present.

Hence, the indication of the overheating situation may be used to indicate when the UE is configured for Dual uplink Tx, causing intermodulation products interfering with the UE LTE receiver for certain band combinations. Moreover, the indication of the overheating situation may indicate that the current Dual uplink Tx configuration is the cause for overheating, or that certain band combination causing intermodulation products interfering with the UE LTE receiver, as discussed. In some embodiments, the indication of the overheating situation included in the capability information may be transmitted in at least one of the following situations: detection of a real overheating (e.g. based on a temperature measurement), and in the case that a problematic band combination is used for a dual uplink transmission.

The capability information may indicate a combination of a new radio uplink band and a LTE uplink band, which may be problematic, as discussed, and the network (e.g. LTE and/or NR eNodeB) may reconfigure the uplink transmission of the user equipment.

The capability information may indicate a capability of the user equipment, based on the detected overheating situation. Hence, the circuitry may decide that the current capability setting results in the overheating situation and may solve this by transmitting corresponding new or temporal capability information, which may include at least one of the following: normal setting; single tx (separate LTE and NR Uplink Tx band); UL sharing TDM based (same frequency band); No NR support at all for UE UL tx; No NR support at all (including DL as well); Problematic band combination; Simultaneous Uplink Tx (including LTE Band and NR Band).

Some embodiments pertain to a base station for a mobile telecommunications system including circuitry configured to communicate with at least one user equipment, wherein the circuitry is further configured to receive capability information from the eat least one user equipment, wherein the capability information is transmitted by the user equipment based on a detected overheating situation, as also discussed. The base station may be a new radio base station or a LTE base station, as discussed herein.

The base station circuitry may be further configured to adjust an uplink configuration for the at least one user equipment, based on the received capability information.

The adjustment of the uplink configuration may include at least one of the following: Single tx (separate LTE and NR Uplink Tx band); UL sharing TDM based (single tx, same frequency band); No NR support at all for UE UL tx; No NR support at all (including DL as well).

Figure 4:
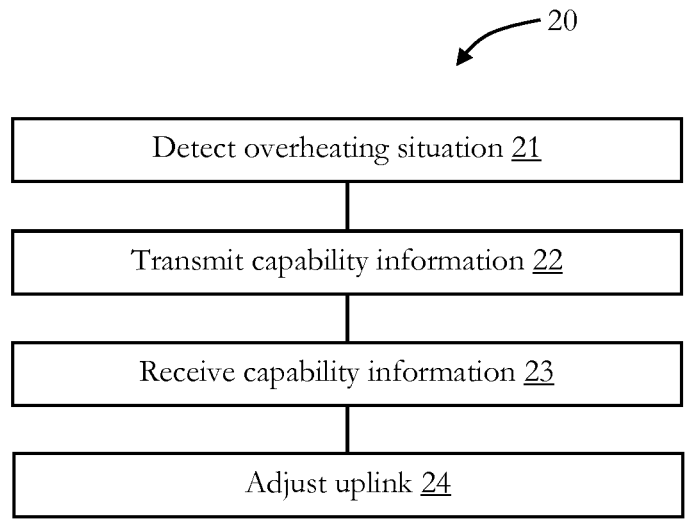
FIG. 4 illustrates a method for mobile telecommunications according to an embodiment.

Returning to FIG. 4, there is illustrated an embodiment of a mobile telecommunications method 20 which can be performed by the UE (e.g. UE 6 of FIG. 1) and the LTE and/or NR base station (e.g. LTE eNodeB 3 and NR eNodeB 5, FIG. 1).

As mentioned, in some embodiments, it is only the UE who has the ability to detect the co-existence problem due to intermodulation issues. The network does not know whether a UE is experiencing performance degradation due to LTE-NR co-existence or not. Hence, in this embodiment the network (e.g. NR/LTE eNodeB) gets knowledge about the co-existence problem, since the UE sends a capability information which may include an indication of an overheating situation, which may be based on a co-existence situation, (which may be interpreted by the network as a co-existence indication) to network once the overheating situation occurs.

At 21, the UE detects an overheating situation. This detection may be based on several triggers.

For example, the UE experiences a downlink (LTE or NR) performance degradation on a problematic band combination or multiple problematic band combinations. This can be detected, e.g., since the UE cannot decode the LTE PDCCH correctly (decoding error), or since the RSRP on the reference signal is below a certain threshold. Moreover, the UE can additionally correlate this sudden decrease in radio conditions on the downlink with a simultaneous uplink transmission timing.

Alternatively (or additionally), the UE detects the overheating situation based on overheat problems, e.g. based on temperature measurements, based on problematic uplink band combination, etc., and this problem can be correlated with a simultaneous dual uplink transmission.

In some embodiments, also a combination of the above alternatives is implemented for detecting the overheating situation at 21, e.g. by detecting that the overheat situation occurs only for certain band combinations when dual uplink transmission is configured.

Alternatively, the UE does not experience any overheating issue but detects an overheating situation at 21, since it knows from previous experience, e.g. from previous overheating issues for problematic band combinations that overheating might occur.

As mentioned, when at least one of the trigger(s) mentioned above is triggered, i.e. the UE has detected an overheat situation at 21, as discussed above, the UE transmits, at 22, capability information to the network (e.g. NR and/or LTE base station).

The capability information may include an indication of the overheating situation, e.g. the problematic band combination on which UE is experiencing performance degradation by the simultaneous UL transmissions. Moreover, the capability information may also include information about a new (temporal) reduced capability of the UE.

As will be discussed further below, the capability information may be transmitted in a temporary UE capability signaling.

The network, e.g. NR and/or LTE eNodeB receives the capability information at 23.

After receiving this information, the network will adjust at 24 the LTE and/or NR UL configuration to at least one of the following:
- Single tx (separate LTE and NR Uplink Tx band)
- UL sharing TDM based (single tx, same frequency band)
- No NR support at all for UE UL tx
- No NR support at all (including DL as well)

Since the UE capability is exchanged at the time of attach or downloaded from the MME (Mobile Management Entity), the traditional UE capability framework does not offer flexibility to dynamically signal its overheat and/or IM interference situation, in some embodiments, and, thus, in some embodiments, a temporary capability information exchange procedure is used.

In some embodiments, this temporary UE capability procedure is standardized for the cases where, e.g., overheating takes place in the UE in LTE.

In some embodiments, for NR a temporary capability degradation signaling might be used, which uses the assistance information procedure, for indicating an overheat situation.

Hence, in some embodiments the assistance information may include the (new, or degraded, temporal) capability information and, it may additionally include the indication of the overheating situation, such as the problematic band combination.

Figure 5:
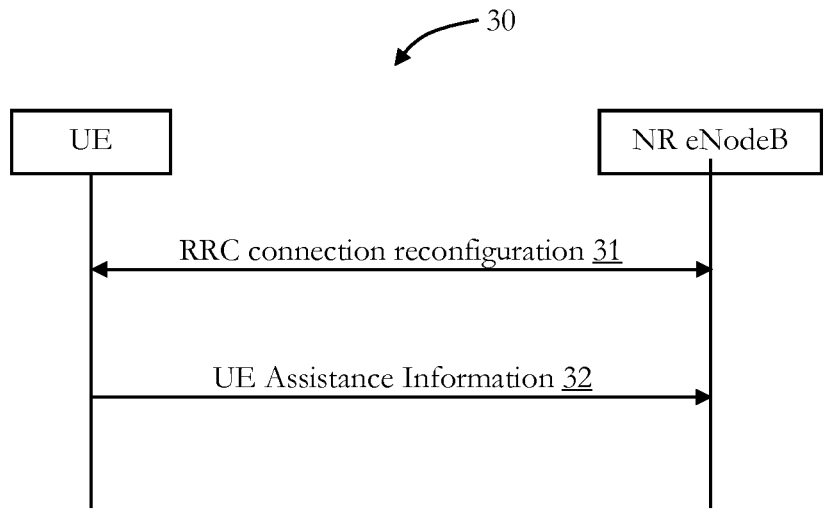
FIG. 5 illustrates an embodiment for signaling of assistance information.

In some embodiments, the enhanced signaling is performed in accordance with a signaling procedure 30, as also illustrated in FIG. 5.

This procedure 30, the basic principle of which is also, generally, known from 3GPP TS 36.331 (see, for example, 3GPP TS 36.331 V14.4.0 (2017-09), 3rd Generation Partnership Project; Technical Specification Group Radio Access Network; Evolved Universal Terrestrial Radio Access (E-UTRA); Radio Resource Control (RRC); Protocol specification, (Release 14)), is updated in some embodiments to support, simultaneous uplink transmission timing assistance information due to overheating and/or due to experienced IM interference, when using Dual uplink Tx, as discussed.

A UE capable of providing assistance information in RRC_CONNECTED, where at 31 RRC connection reconfiguration message is transmitted, may initiate the procedure, if it has been configured to provide simultaneous uplink assistance information at 32, upon detecting an overheating situation, such as an IM interference, or internal overheating caused by simultaneous dual uplink transmission, as discussed above. Hence, the UE assistance information may be used for transmission of the capability information.

The UE Assistance Information (including the capability information) includes the following additional information (partially or fully): the simultaneous uplink assistance information, which includes information about at least one of the following capabilities:
- normal;
- Single tx (separate LTE and NR Uplink Tx band);
- UL sharing TDM based (same frequency band);
- No NR support at all for UE UL tx;
- No NR support at all (including DL as well);
- Problematic band combination
- SimultaneousUplinkTx (LTE Band and/or NR Band)

As discussed above, the network, e.g. the NR eNodeB (or LTE eNodeB) will use the capability information transmitted in the assistance information for adjusting the uplink transmission.

Hence, summarizing, in some embodiments, the UE informs the base station that the current Dual Uplink Tx configuration is causing an overheat problem, as discussed above.

In some other embodiments, the UE indicates that a certain band combination is causing co-existence problems based on intermodulation products from the simultaneous uplink transmission, as discussed above.

In yet other embodiments, the UE may change a band combination list between two subsequent updates of the UE capability, wherein the above discussed capability signaling may be performed. For example, if the UE indicated an overheating problem which existed for bands A, B, C and then due to IM interference issue, an overheating occurs or may occur in the future, then the UE may change the capability signaling accordingly.

Figure 6:
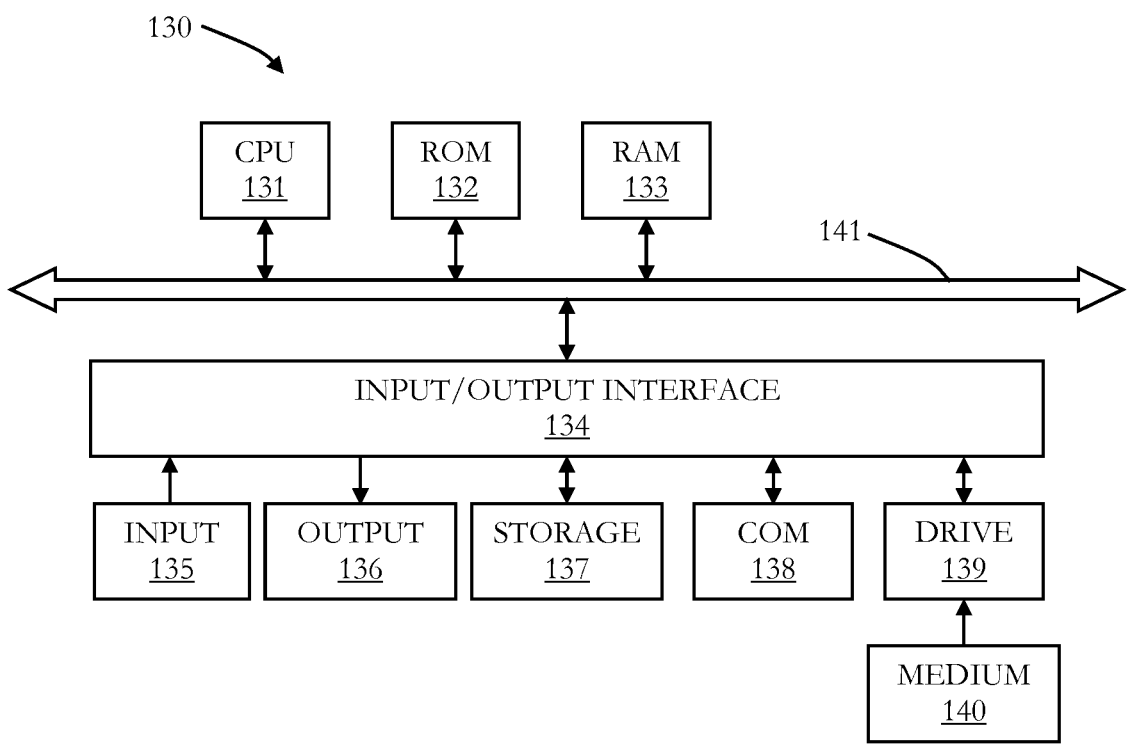
FIG. 6 illustrates a general purpose computer which is able to implement the base stations and user equipments as described herein.

In the following, an embodiment of a general purpose computer 130 is described under reference of FIG. 6. The computer 130 can be implemented such that it can basically function as any type of base station or new radio base station, transmission and reception point, or user equipment as described herein. The computer has components 131 to 140, which can form a circuitry, such as any one of the circuitries of the base stations, and user equipments, as described herein.

Embodiments which use software, firmware, programs or the like for performing the methods as described herein can be installed on computer 130, which is then configured to be suitable for the concrete embodiment.

The computer 130 has a CPU 131 (Central Processing Unit), which can execute various types of procedures and methods as described herein, for example, in accordance with programs stored in a read-only memory (ROM) 132, stored in a storage 137 and loaded into a random access memory (RAM) 133, stored on a medium 140 which can be inserted in a respective drive 139, etc.

The CPU 131, the ROM 132 and the RAM 133 are connected with a bus 141, which in turn is connected to an input/output interface 134. The number of CPUs, memories and storages is only exemplary, and the skilled person will appreciate that the computer 130 can be adapted and configured accordingly for meeting specific requirements which arise, when it functions as a base station, and user equipment.

At the input/output interface 134 several components are connected: an input 135, an output 136, the storage 137, a communication interface 138 and the drive 139, into which a medium 140 (compact disc, digital video disc, compact flash memory, or the like) can be inserted.

The input 135 can be a pointer device (mouse, graphic table, or the like), a keyboard, a microphone, a camera, a touchscreen, etc.

The output 136 can have a display (liquid crystal display, cathode ray tube display, light emittance diode display, etc.), loudspeakers, etc.

The storage 137 can have a hard disk, a solid state drive and the like.

The communication interface 138 can be adapted to communicate, for example, via a local area network (LAN), wireless local area network (WLAN), mobile telecommunications system (GSM, UMTS, LTE, NR etc.), Bluetooth, infrared, etc.

It should be noted that the description above only pertains to an example configuration of computer 130. Alternative configurations may be implemented with additional or other sensors, storage devices, interfaces or the like. For example, the communication interface 138 may support other radio access technologies than the mentioned UMTS, LTE and NR.

When the computer 130 functions as a base station, the communication interface 138 can further have a respective air interface (providing e.g. E-UTRA protocols OFDMA (downlink) and SC-FDMA (uplink)) and network interfaces (implementing for example protocols such as S1-AP, GTP-U, S1-MME, X2-AP, or the like). Moreover, the computer 130 may have one or more antennas and/or an antenna array. The present disclosure is not limited to any particularities of such protocols.

It should be recognized that the embodiments describe methods with an exemplary ordering of method steps. The specific ordering of method steps is however given for illustrative purposes only and should not be construed as binding.

The methods as described herein are also implemented in some embodiments as a computer program causing a computer and/or a processor and/or circuitry to perform the method, when being carried out on the computer and/or processor and/or circuitry. In some embodiments, also a non-transitory computer-readable recording medium is provided that stores therein a computer program product, which, when executed by a processor/circuitry, such as the processor/circuitry described above, causes the methods described herein to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A user equipment for a mobile telecommunications system including circuitry configured to communicate with a new radio base station and a LTE base station, wherein the circuitry is further configured to:
perform simultaneous uplink communication with the LTE base station and the new radio base station;
detect an overheating situation; and
transmit capability information in response to detecting the overheating situation.

(2) The user equipment of (1), wherein the overheating situation is detected based on a predefined combination of a new radio uplink band and a LTE uplink band.

(3) The user equipment of (1) or (2), wherein the overheating situation is detected based on a decoding error.

(4) The user equipment of anyone of (1) to (3), wherein the overheating situation is detected based on a signal strength of a reference signal.

(5) The user equipment of anyone of (1) to (4), wherein the overheating situation is detected based on a temperature measurement of a receiver of the circuitry.

(6) The user equipment of anyone of (1) to (5), wherein the overheating situation is detected based on the simultaneous uplink communication with the LTE base station and the new radio base station.

(7) The user equipment of anyone of (1) to (6), wherein the overheating situation is detected based on history information indicating a previous overheating situation.

(8) The user equipment of anyone of (1) to (7), wherein the capability information is transmitted based on an assistance information signaling procedure.

(9) The user equipment of anyone of (1) to (8), wherein the capability information indicates the overheating situation.

(10) The user equipment of (9), wherein the capability information indicates a combination of a new radio uplink band and a LTE uplink band.

(11) The user equipment of anyone of (1) to (10), wherein the capability information indicates a capability of the user equipment, based on the detected overheating situation.

(12) A base station for a mobile telecommunications system comprising circuitry configured to communicate with at least one user equipment, wherein the circuitry is further configured to:
receive capability information from the eat least one user equipment, wherein the capability information is transmitted by the user equipment based on a detected overheating situation.

(13) The base station of (12), wherein the circuitry is further configured to adjust an uplink configuration for the at least one user equipment, based on the received capability information.

The invention claimed is:

1. A user equipment for a mobile telecommunications system comprising circuitry configured to communicate with a new radio base station and a LTE base station, wherein the circuitry is further configured to:
perform simultaneous uplink communication with the LTE base station and the new radio base station;
compare a combination of a new radio uplink band and a LTE uplink band to a predefined combination;
on condition that the combination of the new radio uplink band and the LTE uplink band equals the predefined combination, detect an overheating situation; and
transmit capability information including maximum capability of the user equipment and whether or not the overheating situation is detected based on the comparison of the combination to the predefined combination, wherein the capability information includes a temporal reduced capability of the user equipment that indicates an adjustment of an uplink configuration, the adjustment including at least one of: separate LTE and new radio (NR) uplink bands, time division multiplexing uplink sharing of a same frequency for LTE and NR, band, no NR support for uplink and downlink, and simultaneous uplink for LTE and NR bands.

2. The user equipment of claim 1, wherein the circuitry is further configured to detect the overheating situation based on a decoding error.

3. The user equipment of claim 1, wherein the circuitry is further configured to detect the overheating situation based on a signal strength of a reference signal.

4. The user equipment of claim 1, wherein the circuitry is further configured to detect the overheating situation based on a temperature measurement of a receiver of the circuitry.

5. The user equipment of claim 1, wherein the circuitry is further configured to detect the overheating situation based on the simultaneous uplink communication with the LTE base station and the new radio base station.

6. The user equipment of claim 1, wherein the circuitry is further configured to detect the overheating situation based on history information indicating a previous overheating situation.

7. The user equipment of claim 1, wherein the capability information is transmitted based on an assistance information signaling procedure.

8. The user equipment of claim 1, wherein the capability information indicates the overheating situation.

9. The user equipment of claim 8, wherein the capability information indicates a combination of the new radio uplink band and the LTE uplink band.

10. The user equipment of claim 1, wherein the capability information indicates a capability of the user equipment, based on the detected overheating situation.

11. A base station for a mobile telecommunications system comprising circuitry configured to communicate with at least one user equipment, the base station being one of a new radio base station and a LTE base station, wherein the circuitry is further configured to:
    receive capability information from the at least one user equipment, wherein the capability information is transmitted by the at least one user equipment that performs simultaneous uplink communication with the LTE base station and the new radio base station,
    compare a combination of a new radio uplink band and a LTE uplink band to a predefined combination,
    wherein the capability information includes maximum capability of the user equipment and, on condition that the combination of the new radio uplink band and the LTE uplink band equals the predefined combination, detect an overheating situation based on the comparison of the combination to the predefined combination, and
    adjust an uplink configuration for the at least one user equipment, based on the received capability information including at least one of: providing separate LTE and new radio (NR) uplink bands, providing time division multiplexing uplink sharing of a same frequency for LTE and NR, band, providing no NR support for uplink and downlink, and providing simultaneous uplink for LTE and NR bands.

12. A method for determining capability information of a user equipment for a mobile telecommunications system configured to communicate with a new radio base station and a LTE base station, the method comprising:
    performing simultaneous uplink communication with the LTE base station and the new radio base station;
    comparing a combination of a new radio uplink band and a LTE uplink band to a predefined combination;
    on condition that the combination of the new radio uplink band and the LTE uplink band equals the predefined combination, detecting an overheating situation; and
    transmitting capability information in response to detecting the overheating situation, wherein the capability information includes maximum capability for the user equipment and whether or not the overheating situation is detected based on the comparison of the combination to the predefined combination; and
    adjusting an uplink configuration for the user equipment, based on the received capability information, including at least one of: providing separate LTE and new radio (NR) uplink bands, providing time division multiplexing uplink sharing of a same frequency for LTE and NR, band, providing no NR support for uplink and downlink, and providing simultaneous uplink for LTE and NR bands.

* * * * *